UNITED STATES PATENT OFFICE.

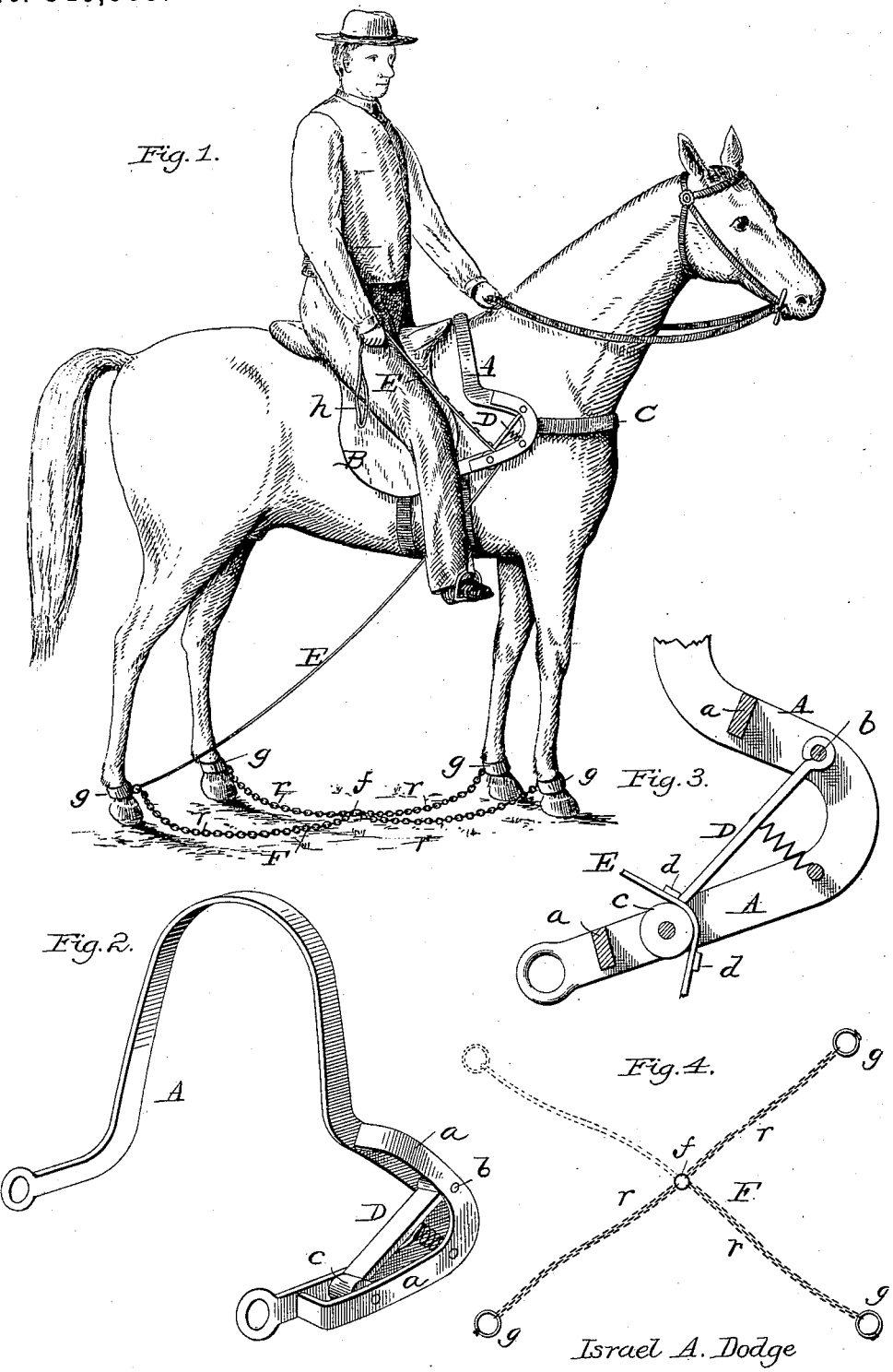

ISRAEL ALEXANDER DODGE, OF BRADY, TEXAS.

APPLIANCE FOR TRAINING HORSES.

SPECIFICATION forming part of Letters Patent No. 346,989, dated August 10, 1886.

Application filed May 6, 1886. Serial No. 201,356. (No model.)

*To all whom it may concern:*

Be it known that I, ISRAEL ALEXANDER DODGE, of Brady, in the county of McCulloch and State of Texas, have invented certain new and useful Improvements in Appliances for Breaking and Training Horses, of which the following is a specification.

My invention relates to means or appliances for breaking or training horses; and it consists, essentially, in a leg-halter composed of chains or ropes connected by a common ring, or otherwise, and provided with gyves or shackles to encircle the pastern of each leg, a yoke or frame placed upon the withers, or forward or back thereof, and provided with a clamp, and a band passing through the clamp and down to one of the shackles, or to the horse's leg, the other end being carried to a convenient point to be grasped by the trainer or attendant.

In the drawings hereto annexed, Figure 1 is a side elevation of a horse and rider, showing the manner of applying and using my invention. Figs. 2, 3, and 4 are views of certain details and modifications.

A indicates a yoke, of metal or other suitable material, fashioned to fit well upon the withers, or just in advance or rear thereof, or it may be made to fit upon or be secured to the saddle B when a saddle is used. When designed to be placed directly upon the horse, the yoke should be padded to prevent abrasion or injury of the skin of the animal. Straps or bands C serve to secure the yoke firmly in place, said bands passing about the breast and under the body of the horse, as indicated, or in such other way as may be found expedient. The yoke A is bent forward at its lower end, on one side, and then backward, as shown in Figs. 1 and 2, and to the side of the bent portion is secured another metal plate or strap, *a*, of essentially the same form as that part of the yoke.

D indicates a tongue or bar pivoted at its upper end between the body of the yoke and the other plate or strap, *a*, upon a bolt or pin, *b*, and resting at its lower end upon a pin or roller, *c*, or upon a band, E, passing between the roller and tongue. The tongue may be roughened or formed with a sharp or angular edge to engage with and hold the band E between it and the pin or roller *c*; but in practice I prefer to provide the band with transverse ribs *d*, for the end of the tongue to abut against, thus preventing all chances of slipping.

F indicates a leg-halter consisting ordinarily of four chains or ropes, *r*, attached to a common ring, *f*, or otherwise, and each furnished with a gyve, fetter, or shackle, *g*, to encircle the pasterns of the horse's leg. When the horse is not shod, the halter F will consist of four chains or bands, *r*; but when the horse is shod one of the bands *r* is omitted, as indicated by the dotted lines in Fig. 4. The reason for this variation in the construction of the halter is that when the horse is shod the calks on the shoes are liable to be caught in the links of the chain; but where the horse is not shod there is no chance for any such difficulty. To one of these fetters or shackles, advisably the rear right-hand one, is attached one end of the strap or band E, the other end of which is furnished with a hand-hold or ring, *h*, by which the band may be conveniently drawn, as required.

The device being constructed as above set forth is applied to the horse as indicated in Fig. 1, the leg-halter preventing the animal from kicking, rearing, or running away while being broken. If at any time the animal becomes fractious and attempts, in spite of the rider, to kick or rear, it is only necessary to draw upon the band E, which will cause the leg to which the band extends to be drawn and held forward, thus so far limiting or restricting the animal's movements as to effectually prevent its becoming unmanageable. The band when drawn up is firmly held at any desired point by the tongue or clamp D, and thus both hands of the horseman are left free after the band is adjusted. When the animal is brought completely under control, the band may again be slackened by raising the tongue D, which will be normally held down by a spring, *i*.

The device is designed more particularly for the use of equestrians, but may be employed generally for breaking and training horses, whether the person using it ride upon the horse, walk beside, or drive him in harness. The band may pass directly to the horse's leg, instead of being attached to the shackle.

The leg-halter is designed for use in connection with the other devices only when breaking the horse, and when riding the leg-halter is removed, the band E being retained and connected to the rear right leg of the horse.

When grazing, the leg-halter is applied without the other devices herein shown and described, the halter preventing the animal from strolling or running away, but allowing free use of his limbs.

I am aware that it has been proposed to construct a horse-training device of four straps, passing diagonally across the horse through pulleys, and secured, respectively, to the forearms and the hams of a horse, and to this I make no claim. Under my plan the straps, while being connected, are capable of independent movement, which is not the case in the construction above referred to, because as one forward leg is moved forward it draws the correspondingly diagonal hind leg.

My device permits me to raise or lift one of the legs of the horse entirely off the ground, and by the use of the straps or bands, arranged as described, I am also enabled to prevent the horse from running away when in pasture. These features cannot be accomplished by the construction above disclaimed.

Having thus described my invention, what I claim is—

1. The herein-described device for use in breaking and training horses, consisting of a yoke adapted to fit upon the body of the horse and provided with a clamp, a leg-halter applied to the legs of the horse, and a band passing through the clamp and extending to one of the legs of the horse, all operating substantially as described.

2. The combination, substantially as described and shown, of a yoke, A, provided with tongue or clamp D, band E, passing through said clamp, and leg-halter F, having band E, attached to one of its branches, substantially as described and shown.

3. In a device for breaking or training horses, the combination of a yoke or frame adapted to be secured upon the horse and provided with a clamping device, and a band passing through said clamp and adapted to be connected with a leg of the horse, all constructed substantially as described.

4. The combination, with yoke A, having tongue D, of band E, provided with transverse ribs, substantially as and for the purpose explained.

5. The combination, with yoke A and band E, of a clamping or retaining device carried by the yoke and adapted to hold the band at any desired point.

6. The herein-described device for use in training horses, consisting of yoke A, having plate $a$, bolt or pin $b$, and pin or roller $c$, tongue D, carried by bolt $b$, and band E, passing between the tongue and roller, substantially as set forth.

7. A leg-halter composed of bands connected together and provided with shackles to encircle the pastern of each leg of the animal, substantially as and for the purpose set forth, each band being capable of movement independently of the other.

8. The herein-descrile e l leg-halter, composed of three or more bands, $r$, each connected to a ring, $f$, and provided with shackles $g$.

ISRAEL ALEXANDER DODGE.

Witnesses:
J. T. WILLIAMSON,
M. JONES.